Sept. 29, 1964  J. M. SOTH  3,150,832
BYPASS FLOWDIVIDER VALVE
Filed Oct. 29, 1962

Inventor:
John M. Soth
By Bair, Freeman & Molinare
Attys.

United States Patent Office 3,150,832
Patented Sept. 29, 1964

3,150,832
BYPASS FLOWDIVIDER VALVE
John Michael Soth, Des Moines, Iowa, assignor to Delavan Manufacturing Company, West Des Moines, Iowa, a corporation of Iowa
Filed Oct. 29, 1962, Ser. No. 233,513
9 Claims. (Cl. 239—443)

This invention relates to a novel flowdivider construction for fluids such as fuel, and more particularly to a bypass valve having two discharge openings, one of which is effective at all times, and the other of which is effective when the pressure in the valve builds up to a predetermined point and thereafter its effectiveness is increased with an increase of fluid pressure. The valve of the present invention is especially suitable for use with a gas turbine engine in conjunction with a dual orifice atomizing nozzle of the type shown in Olson Patent No. 2,703,260, being operable to supply fuel from a single pressure source to both the primary and secondary stages thereof.

One object of the invention is to provide a flowdivider that requires a minimum number of parts for its operation.

Another object is to provide a bypass flowdivider that enables a dual orifice atomizing nozzle of the type shown in the Olson patent to achieve flow discharge ranges as high as 100:1 with satisfactory atomization at all flow rates within this range.

Still another object is to provide a valve of the character disclosed that resists contamination, being so constructed as to permit ready flow of contaminants therethrough instead of trapping the same.

A further object is to provide a flowdivider valve of the character herein disclosed which is able to perform well on high viscosity fuels or other liquids.

Still a further object is to provide a flowdivider valve involving parts which are not critical and therefore possible for mass production with each valve produced capable of high performance.

An additional object is to provide a flowdivider valve which provides smooth transition from primary to secondary operation of the dual orifice atomizing nozzle to which it supplies fuel.

An additional object is to provide a flowdivider valve which is so constructed as to operate properly and efficiently even when subject to pressure pulsations.

With these and other objects in view, my invention consists in the construction, arrangement and combination of the various parts of my bypass flowdivider valve, whereby the objects above contemplated are attained, as hereinafter more fully set forth, pointed out in my claims and illustrated in detail on the accompanying drawings, wherein:

Figure 1:
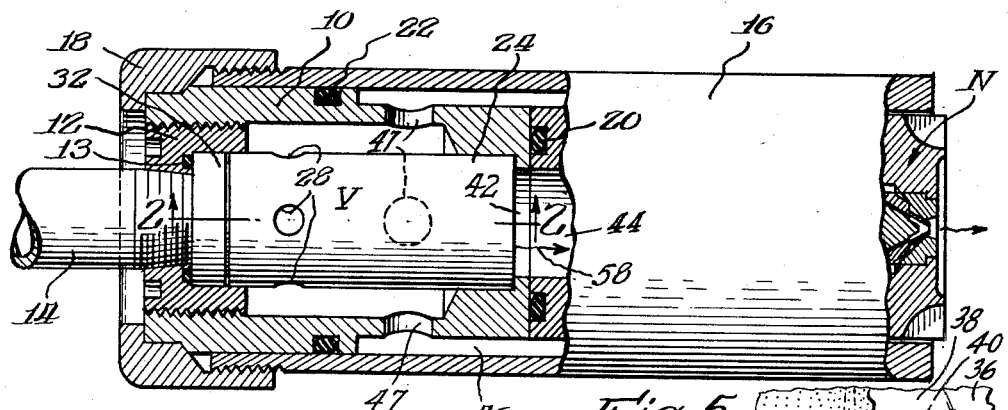
FIG. 1 is an elevation of my bypass flowdivider valve showing it mounted in a housing together with a dual orifice atomizing nozzle of the kind shown in the Olson patent above referred to for supplying fuel to both the primary and secondary stages thereof.

On the accompanying drawing I have used the reference numeral 10 in FIG. 1 to indicate an adapter in which my flowdivider valve shown generally at V is mounted. A retainer plug 12 holds the valve in mounted position and an O-ring 13 may be provided for sealing purposes. A fluid inlet pipe 14 is threaded into the retainer plug 12 for supplying fuel or other fluid under pressure to the valve V.

The adapter 10 is mounted in one end of a nozzle receiving body 16, a retainer nut 18 being provided for securing the same therein. O-rings 20 and 22 may be provided for sealing purposes.

A nozzle N is shown mounted in the right hand end of the body 16 in FIG. 1, such nozzle being the dual orifice atomizing type shown in the Olson patent and having a primary stage communicating with an opening 42 at the right hand end of the valve body 10 and an opening 44 in the nozzle body 16. The nozzle N also has a secondary stage communicating with an annular passageway 46 which in turn communicates with the bypass ports 47.

Figure 2:
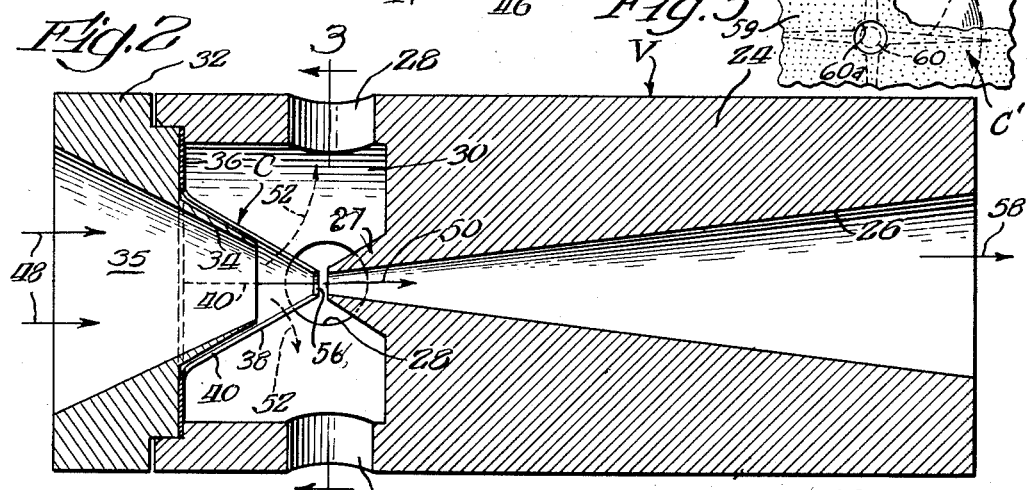
FIG. 2 is an enlarged horizontal sectional view on the line 2—2 of FIG. 1 showing my valve per se.

Referring to the flowdivider valve V as seen in FIG. 2, a cylindrical outlet housing 24 constitutes the major portion thereof and has therein an exit cone-shaped cavity 26 provided with a fluid deflecting projection 27 adjacent its inlet end. The housing 24 is also provided with a bypass cavity 30 from which bypass ports 28 lead into the nozzle receiving body 16. The left hand end of the outlet housing 24 is closed by means of an inlet plug 32 which has an inlet truncated cone 34 surrounding an inlet passageway 35.

A flexible metering cone C is provided, formed of thin sheet metal in the form of a base flange 36 and a truncated cone portion 38. The portion 38 is provided with a plurality of slits 40. The terminal end of the metering cone C (which is the right hand in FIG. 2) is closely adjacent but spaced from the inlet end of the exit cavity 26, and the internal diameter of the two is substantially the same to permit ready flow of fluid entering the inlet plug 32 as indicated by the arrows 48 in FIG. 2 into the cavity 26 as indicated by the arrow 50.

Figures 3, 4:
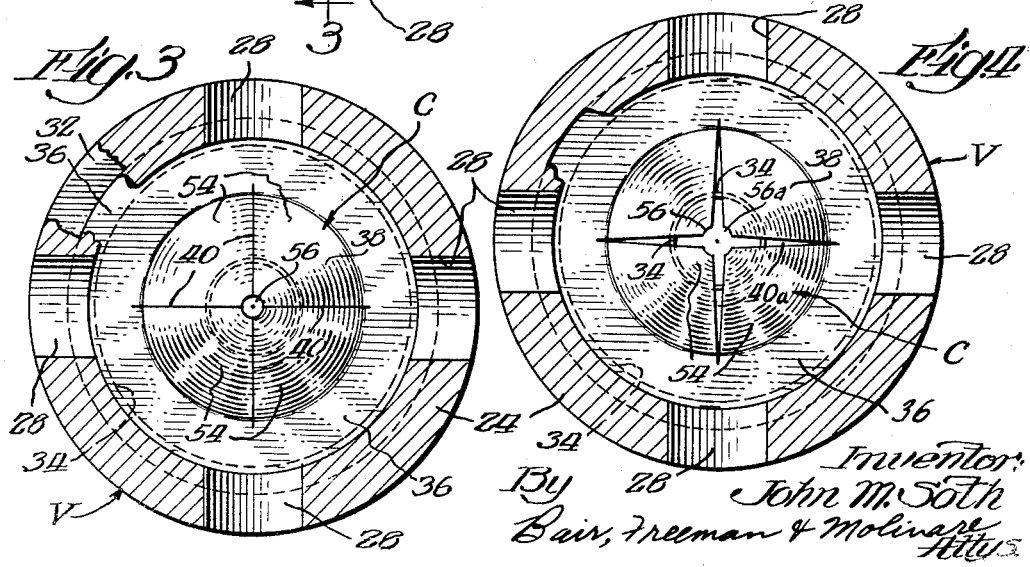
FIG. 3 is a vertical sectional view on the line 3—3 of FIG. 2 showing a metering cone of the valve in normal low pressure position.
FIG. 4 is a similar sectional view showing parts of the metering cone in the position they assume upon being subjected to high pressure at the inlet of the flowdivider valve and during secondary stage operation thereof.

After the slits 40 are formed they are pressed closed and leave several adjacent segments or cantilever members (four as shown at 54 in FIG. 3). At low fluid pressures these slits remain closed and fluid flow is in accordance with the arrows 50 and 58 through the openings 42 and 44 to the primary stage of the nozzle N.

As pressure builds up, the metering cone segments 54 flex outwardly in the manner of a camera shutter as shown in FIG. 4, increasing the orifice area from that shown at 56 in FIG. 3 to that shown at 56a plus the open slits 40 when open and designated 40a in FIG. 4. As soon as the diameter of the orifice 56 exceeds that of the inlet end of the cavity 26 there is bypass flow as indicated by the dotted arrows 52 in FIG. 2 into the bypass cavity 30 and through the bypass ports 28 and annular passageway 46 to the secondary stage of the nozzle N. At this time the projection 27 serves to split the excess flow 52 away from the inlet end of 26 and divert it to the chamber 30 and bypass ports 28. The projection 27 helps to preserve the streamline flow of fluid through the entrance to the passageway 26 and thus helps to provide a smoother flow curve than would otherwise be attained. As the pressure increases the slits 40 open wider and I have found that as much as a 4:1 to 10:1 ratio of fluid flow can be attained, that is with unit flow when the slits 40 are closed, the pressure can be increased and the flow thereby increased to 4 to 10 units through the slits when opened in the manner disclosed in FIG. 4. Thus a dual orifice atomizing nozzle of the kind shown in the Olson patent having a ratio as high as 40:1 can be operated in the greater range of 160:1 to 400:1 when my flowdivider valve is used in conjunction therewith as disclosed in the foregoing specification.

Figure 5:
FIG. 5 is a fragmentary view showing a modified metering cone construction.

An alternate construction sometimes useful is obtained by coating the cone C with resilinet flexible material. In FIG. 5 I show such modification, the coated cone being indicated generally C' and the coating which may be of rubber-like material is shown at 59 and by means of stippling. The cone 38 shown in FIG. 5 is in the high pressure position similar to the cone shown in FIG. 4 and it will be noted the coating 58 has stretched in such manner as to still cover the slots 40 so that the only opening through the cone is the one indicated at 60a. This is an expanded diameter of the initial diameter indicated at 60 which is the one in effect when the slits 40 are closed as in FIG. 3. Thus with the coating 59 the circular orifice 60a is the only one through which the fuel can flow and is not increased by the opening of the slits as in FIG. 4. For certain installations where fluid flow ratio need not be as great and where the nozzle end is so designed that the opening of the slits 40 would cause too great an increase in flow, the coating 58 may be provided.

Some changes may be made in the construction and arrangement of the parts of my bypass flowdivider valve without departing from the real spirit and purpose of my invention, and it is my intention to cover by my claims any modified forms of structure or use of mechanical equivalents which may reasonably be included within their scope.

I claim as my invention:

1. In a bypass flowdivider valve for supplying fluid to a two stage atomizing nozzle, a valve body having a fluid inlet, said valve body having a fluid outlet to the first stage of said nozzle, said inlet and said outlet being oppositely arranged for straight-through flow of the fluid and having a gap between them, a cavity within said valve body communicating said gap with the second stage of said two stage atomizing nozzle, and a flexible metering cone member communicating with said inlet and having its small end defining one side of said gap, the inlet end of said fluid outlet defining the other side thereof, said cone member having a discharge opening at said small end which is adjacent said inlet end of said fluid outlet and a plurality of slits extending therefrom whereby an increase of pressure on the fluid to said inlet increases the size of said discharge opening beyond that of said inlet end of said fluid outlet and spreads the segments of said cone member thereby opening the slits thereof to increase the flow of fluid therefrom through said cavity to said second stage of said two stage atomizing nozzle.

2. A bypass flowdivider valve for supplying fluid to a two stage atomizing nozzle comprising a valve body having a fluid inlet and a fluid outlet, said fluid outlet communicating with the first stage of said nozzle, said inlet and said outlet being oppositely arranged for straight-through flow of the fluid and having a gap between them, a cavity within said valve body communicating said gap with the second stage of said two stage atomizing nozzle, and a flexible metering cone member extending from said inlet and having a discharge opening at its small end and a plurality of slits extending therefrom whereby an increase of pressure in said inlet spreads the segments of said cone member and thereby opens said slits in proportion to such pressure, said discharge opening and the inlet end of said fluid outlet being aligned on opposite sides of said gap and said inlet end having a projection into said cavity toward said discharge opening of said cone member.

3. In a bypass flowdivider valve for supplying fluid to a two stage atomizing nozzle, a valve body having a fluid inlet and a fluid outlet, oppositely arranged-cone-shaped passages in said valve body between said inlet and said outlet having their constricted ends directed toward, aligned with and spaced from each other for fluid flow from said inlet passage to said outlet passage, said fluid outlet passage supplying fluid to the first stage of said two stage atomizing nozzle, a bypass cavity within said valve body communicating the space between said cone-shaped passages with the second stage of said two stage atomizing nozzle, and a flexible metering cone defining the discharge end of said inlet cone-shaped passage, said metering cone having a plurality of slits extending from the constricted discharge end thereof whereby an increase of pressure on the fluid to said inlet spreads the segments of said metering cone thereby enlarging the discharge end of said inlet and opening the slits of said metering cone to increase the flow of fluid from said metering cone through said bypass cavity to said second stage of said two stage atomizing nozzle.

4. In a bypass flowdivider valve, a valve body having a fluid inlet and a fluid outlet, oppositely arranged cone-shaped passages in said valve body between said inlet and said outlet having their constricted ends directed toward, aligned with and spaced from each other for fluid flow from said inlet passage to said outlet passage, a bypass cavity within said valve body communicating with the space between said cone-shaped passages, and a flexible metering cone of sheet metal defining the discharge end of said inlet cone-shaped passage, said metering cone having a plurality of slits extending from the constricted discharge end thereof whereby an increase of pressure on the fluid to said inlet enlarges the discharge end of said inlet passage and spreads the segments of said metering cone located between the slits thereof to thereby open them and increase the flow of fluid from said metering cone to said bypass cavity.

5. In a valve of the character disclosed for supplying fluid to a two stage atomizing nozzle, a valve body having a bypass cavity therein to supply fluid to the second stage of said two stage atomizing nozzle, a truncated cone-shaped fluid inlet nozzle projecting into said cavity, a truncated cone-shaped fluid outlet nozzle projecting into said cavity toward and aligned with said fluid inlet nozzle to supply fluid to the first stage of said two stage atomizing nozzle, the constricted ends of said inlet and outlet nozzles being spaced from each other and having openings which are normally substantially the same size relative to each other, and a flexible cone member on said inlet nozzle having a plurality of slits extending from the constricted discharge end thereof, said cone member being effective upon an increase of pressure on the fluid to said inlet to open its discharge end to a diameter larger than the receiving end of said fluid outlet nozzle and at said slits and thereby increase the flow of fluid from said cone member through said cavity to said second stage of said two stage nozzle.

6. A bypass flowdivider valve comprising a two-part valve body, one part constituting an entrance truncated cone and the other containing an exit truncated conical cavity, the constricted ends of said truncated cone and said conical cavity being of substantially the same size, directed toward each other and spaced apart, a bypass cavity in said valve body surrounding said spaced-apart ends, a bypass port from said bypass cavity, a flexible metering truncated cone forming part of said entrance truncated cone in which throat pressure increases with an increase in flow velocity, said metering cone being formed of thin sheet metal and having slits extending from the discharge end thereof toward the base thereof to provide discrete sections operable upon an increase of pressure on the fluid entering said entrance truncated cone to increase the size of the exit opening thereof and spread said sections intermediate said slits upon increase of pressure, thereby increasing the flow of fluid through said bypass port.

7. A bypass flowdivider valve comprising a two-part valve body, one part constituting an inlet and the other containing an exit truncated conical cavity, a bypass cavity in said valve body, a bypass port from said bypass cavity, a metering truncated cone forming with said inlet an entrance truncated cone in which throat pressure increases with an increase in flow velocity, the constricted ends of said entrance truncated cone and said conical cavity being directed toward each other, spaced apart and provided with discharge and receiving openings respectively which are of substantially the same size, said bypass cavity surrounding said spaced apart ends thereof, said metering cone having slits extending from the discharge end toward the base thereof and being adapted to flex when subjected to internal pressure whereby an increase of pressure on the fluid entering said entrance truncated cone tends to spread the sections of said metering cone intermediate said slits and to open said discharge opening to a greater diameter for thereby increasing the flow of fluid through said bypass port.

8. A bypass flowdivider valve for supplying fluid to a two-stage atomizing nozzle comprising a valve body having a fluid inlet and a fluid outlet, said fluid outlet communicating with the first stage of said nozzle, said inlet and said outlet being oppositely arranged for straight-through flow of the fluid and having a gap between them, a cavity within said valve body communicating said gap with the second stage of said two-stage atomizing nozzle, and a flexible metering cone member extending from said inlet and having a central opening and a plurality of slits extending therefrom whereby an increase of pressure in said inlet spreads the segments of said cone member between said slits and thereby opens said slits and increases the effective diameter of said central opening for further flow through both said slits and said central opening and into said cavity in proportion to such pressure and in addition to the flow from said fluid inlet to said fluid outlet.

9. A bypass flowdivider valve for supplying fluid to a two-stage atomizing nozzle comprising a valve body having a fluid inlet and a fluid outlet, said fluid outlet communicating with the first stage of said nozzle, said inlet and said outlet being oppositely arranged for straight-through flow of the fluid and having a gap between them, a cavity within said valve body communicating said gap with the second stage of said two-stage atomizing nozzle, a flexible metering cone member extending from said inlet and having a central opening and a plurality of slits extending therefrom whereby an increase of pressure in said inlet spreads the segments of said cone member and thereby enlarges said opening for additional flow from said inlet into said cavity and opens said slits as the pressure increases, and a resilient flexible coating on said cone member having a discharge opening within said central opening of said cone member, said coating at all times covering said slits but permitting said discharge opening to expand upon such increase in pressure.

References Cited in the file of this patent
UNITED STATES PATENTS

| | | |
|---|---|---|
| 2,595,737 | Von Rotz | May 6, 1952 |
| 2,703,260 | Olson et al. | Mar. 1, 1955 |
| 2,998,198 | Young | Aug. 29, 1961 |
| 3,034,731 | Chapin | May 15, 1962 |